Dec. 8, 1931.   E. L. MABIE   1,835,658

ELECTRICAL MEASURING INSTRUMENT

Filed Aug. 2, 1930   2 Sheets-Sheet 1

Inventor:
Edmund L. Mabie
By Williams,
Bradbury, McCaleb
& Hinkle, Attys.

Dec. 8, 1931.  E. L. MABIE  1,835,658
ELECTRICAL MEASURING INSTRUMENT
Filed Aug. 2, 1930   2 Sheets-Sheet 2
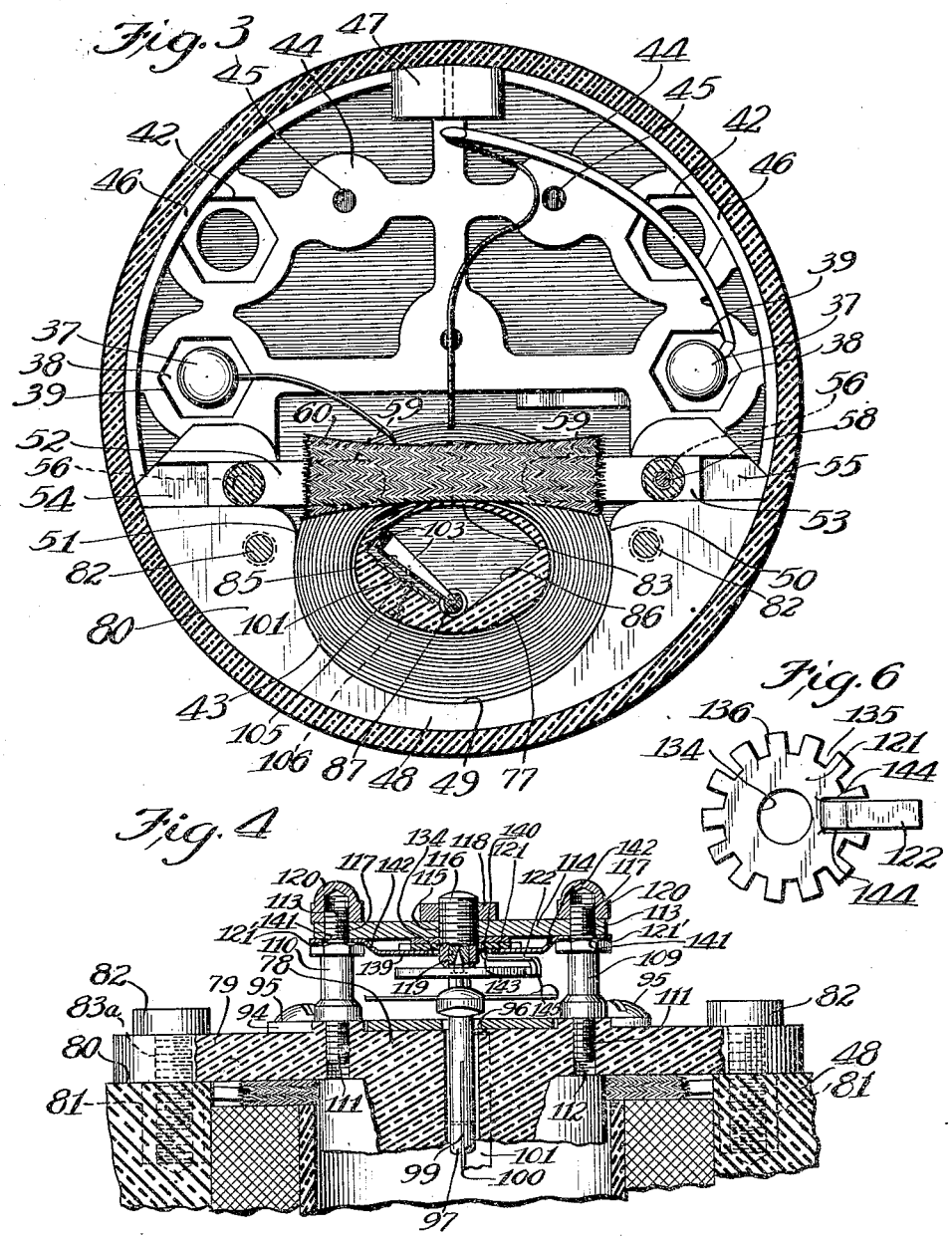
Inventor:
Edmund L. Mabie
By Williams, Bradbury, McCaleb & Hinkle attys.

Patented Dec. 8, 1931

1,835,658

UNITED STATES PATENT OFFICE

EDMUND L. MABIE, OF CHICAGO, ILLINOIS, ASSIGNOR, BY MESNE ASSIGNMENTS, TO JEWELL ELECTRICAL INSTRUMENT CORPORATION, A CORPORATION OF NEW JERSEY

ELECTRICAL MEASURING INSTRUMENT

Application filed August 2, 1930. Serial No. 472,532.

The present invention relates to electrical measuring instruments and is particularly concerned with instruments of the type having a single spring, or instruments having a plurality of springs, some of which are not accessible for adjustment.

In instruments of this type it is highly desirable that the spring which is accessible for adjustment be provided with an adjustable spring abutment which may be located in any of a plurality of adjustable positions so that the torsional strength of the spring and the range of movement may be readily adjusted to keep the pointer within the range of the scale at full load and to bring the initial position of the pointer near the zero mark to which it may be accurately adjusted by a zero adjustment screw if desired.

In the adjustment or calibration of the electrical instruments of the class described, it is desirable to assemble the parts of the instrument in operative relation including the springs which resist the deflection of the pointer, and instruments are usually tested to observe the deflection at determined electrical values, such as, for instance, full load current.

It should be understood that the relative proportions of the parts of the instrument, the size of the scale and scale divisions, size and character of springs and coils, have been predetermined by the construction and calibration of a master instrument, and all of the instrument parts, including the scale and springs, are thereafter made substantially according to pattern. It may be found, however, after the first assembly of any instrument when the instrument is tested, that the deflection for full load current is slightly greater or less than the length of the scale, due to variations in the physical characteristics of the parts, such as the springs or other parts, and consequently it is desirable to adjust the tension of one of the springs which resist deflection of the pointer.

An increase in the effective length of a spring of given cross section and material usually increases the flexibility of the whole, and consequently increases the deflection of the pointer, and a decrease in the effective length of the spring decreases the flexibility, increases the relative stiffness and resistance to deflection, and decreases full load deflection which is usually taken as a standard although any predetermined standard may be used.

In the assembly of the instrument, the adjustable spring may be permanently secured to the moving element, but it is preferably secured to an adjustable spring abutment carried by the bridge in such manner that the spring may be released and made longer or shorter, as for instance, the spring may be secured by a drop of solder between the spring and abutment at a point which is spaced from the end of the spring.

That portion of the end of the spring projecting beyond the solder or other securing means is merely excess length for the purpose of permitting an adjustment of the length of the spring and such excess length of spring does not materially affect the deflection of the instrument.

The instrument is then tested and if the deflection is found to conform to standard, the excess length of spring may be clipped off, but if the spring is too stiff as shown by a scale deflection of less than the full scale at full load, the spring may be loosened from the abutment by the application of heat, and its effective length increased by securing the spring to the abutment again at a point nearer the end of the spring, or if the full load deflection is greater than the scale, the spring may be shortened until full load deflection conforms to the scale.

The scale being fixed with respect to the other parts of the instrument when these adjustments have been made, the no load deflection may not locate the pointer near zero, because the shortening or lengthening of a spiral coil spring rotates the moving element which is attached to the other end of the spring, with respect to the scale, and it is therefore necessary to provide an adjustable abutment for the fixed end of the spring, having a greater range of adjustment than the usual zero correction screw which is only adapted for relatively small corrections.

In some embodiments of the invention the entire range of adjustment may be provided by the adjustable spring abutment, and the zero correction screw may be eliminated so that any zero adjustment or correction would be accomplished by removing the cover and moving the adjustment spring abutment, but the higher grade instruments are preferably provided with a zero correction screw or other device which is accessible from the outside of the instrument.

The spring adjustment devices of the prior art have not been capable of adjustment over the complete range of rotation of three hundred sixty degrees, nor have the prior adjustment devices been capable of adjustment over more than a fraction of one complete turn or coil of a spiral spring, and consequently the adjustments of the prior art were subject to definite physical limitations.

One of the objects of the present invention is the provision of an improved spring abutment which is adjustable to substantially any desired rotative position on the bridge or support to effect a more accurate adjustment of the length and/or tension of a spring, and to bring the moving element into proper position with the scale under all conditions.

Another object is the provision of an adjustable spring abutment which is adapted to rotate through the full range of adjustment of three hundred sixty degrees or more, and which is therefore more adaptable and flexible than the devices of the prior art.

Another object is the provision of approved adjustable spring abutment which is provided with positive securing means such as a latching device for securing the abutment in any adjusted position, as distinguished from the mere frictional engagement between the abutment and the support or member to which it is secured.

Another object is the provision of a positively secured adjustable spring abutment which may be released or secured without the necessity for special tools and the parts of which lend themselves readily to manufacture by ordinary stamping operations, thereby reducing the cost of the instrument and bringing the instrument within the means of a larger number of purchasers.

Another object is the provision of an improved electrical instrument assembly which is capable of more economical manufacture than the devices of the prior art, and which is better adapted to withstand electrical and mechanical abuses.

Another object is the provision of a simplified electrical instrument having an improved spring abutment, an improved indicating unit, an improved casing, and various other features and advantages which will be evident from the accompanying description and drawings in which similar characteristics and references indicate similar parts throughout the several views.

Referring to the drawings, of which there are two sheets,

Fig. 3 is a sectional view taken on the plane of the line 3—3 of Fig. 2;

Fig. 4 is an enlarged sectional view taken on the plane of the line 4—4 of Fig. 2;

Fig. 5 is a view in perspective of the zero correction plate;

Fig. 6 is a plan view of the adjustable spring abutment plate.

Figure 1:
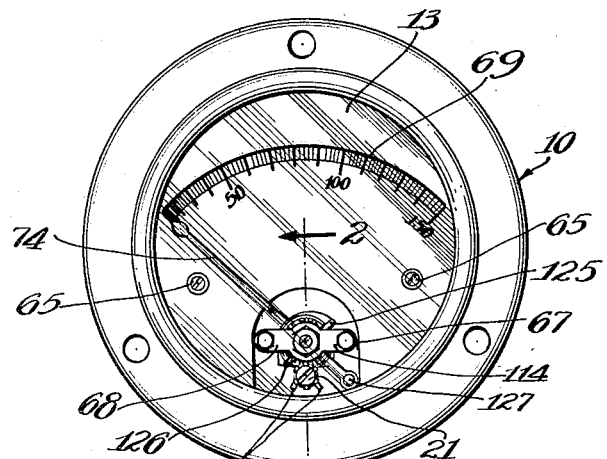
Fig. 1 is a plan view of the front of an instrument constructed according to the present invention.
Figure 2:
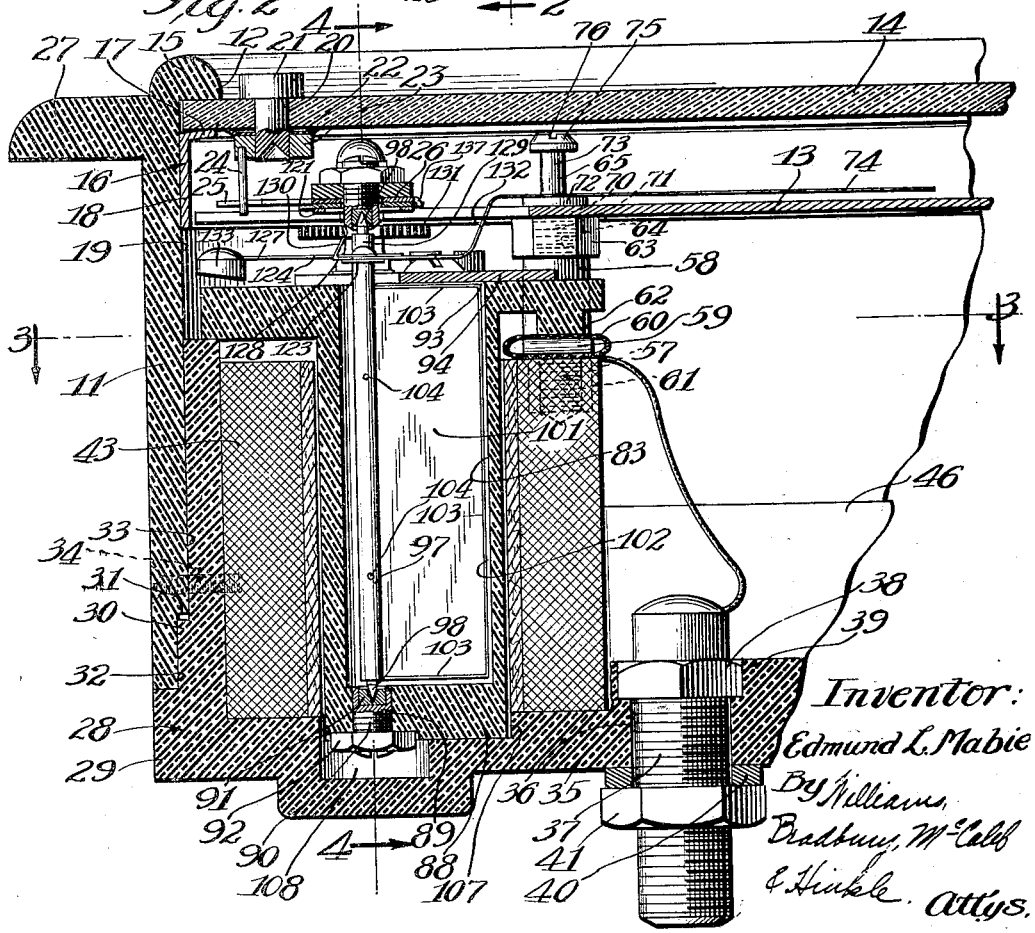
Fig. 2 is an enlarged sectional view taken on the plane of the line 2—2 of Fig. 1.

The instrument which has been selected to illustrate the invention is a volt meter of the magnetic vane type, having a single spiral spring for resisting deflection of the pointer, but the features of the present invention may be embodied in volt meters, ammeters, or other instruments of the moving coil type or any other type employing a spring for which it is desirable to provide an adjustable spring abutment.

Referring to the drawings, the electrical instrument 10 is preferably provided with a casing 11 which may be formed by molding the same of initially plastic material such as a phenolic condensation product or some other molding powder having electrical insulating characteristics.

The casing 11 is preferably substantially cylindrical in form and provided with an open end 12 for exposing the dial 13 which is preferably protected by a transparent cover 14 of glass or other transparent material.

In order to secure the glass cover in casing 11, the casing is preferably formed with an integral inwardly extending annular flange 15 at the opening 12, and the glass 14 may be secured in place by a bezel 16 comprising a metal ring having an inwardly extending annular flange 17 and a substantially cylindrical body flange 18. The body flange 18 is adapted to be secured by frictional engagement with the interior cylindrical wall 19 of the casing 11, the glass being confined between the metal flange 17 of the bezel 16 and the insulating flange 15 carried by the casing 11.

The glass is preferably provided with an aperture 20 within which is rotatably mounted a zero adjustment screw 21 adapted to be held in any adjusted position by the friction which is caused by spring washer 22 confined between the glass and the rivet washer 23. The washer 23 carries the usual eccentric pin 24 for engagement between the oppositely extending diagonal legs 25 of a zero corrector plate 26.

The casing 11 may be provided with an integral annular attaching flange 27 located adjacent the front of the instrument in the flush type of instrument, or the flange 27 may be eliminated where the instrument is adapted to be attached to the front of a board or panel.

The casing 11 may be closed by a molded insulating base 28 of the same material, and the outer wall 29 of the base 28 is preferably similar in shape to that of the casing 11. The casing 11 may be provided with an annular enlargement 30 forming an annular shoulder 31, and the base 28 may be formed with a reduced cylindrical portion 32 adapted to fit in the enlargement 30 and with a cylindrical part 33 adapted to engage the inner wall 19 of the casing 11. The base 28 may be secured to the casing 27 by a plurality of screw bolts 34, extending through the wall of the casing 11, and threaded into the insulating material of the base 28, and the screw bolts 34 are preferably uniformly spaced about the circumference of the casing 11.

The bottom 35 of the base 11 is substantially circular in form to correspond to the casing 11 and is preferably provided with a plurality of connector apertures 36 adapted to receive the connector bolts 37 which are provided with non-circular heads 38 adapted to be received in a complementary non-circular socket 39 formed on the inside of the bottom 35 for preventing rotation of bolts 37. Each of the bolts 37 is preferably provided with a spring washer 40 and one or more nuts 41 for securing the bolt in the casing, and for securing connectors to the outside ends of bolts 37.

Referring to Fig. 3, the base 28 may be provided with a plurality of auxiliary connector bolt sockets 42, for use in providing multiple connectors or taps on the instrument coil 43, and the base may also be provided with a plurality of inwardly projecting bosses 44 for receiving and supporting spools which carry multiplier coils or calibration resistance coils when it is desirable to embody the invention in instruments in which such coils are necessary or desirable. The lugs 44 have threaded apertures 45 into which screw bolts are threaded, the screw bolts passing through the spools.

The base 28 is preferably provided with the inwardly projecting annular wall 46 for engaging the inside of the casing 11 and the wall 46 may be provided with an inwardly projecting boss 47 for receiving one of the screw bolts 34.

At the side of the base 28 where the actuating coil 43 is located, the base 28 is preferably provided with an inwardly projecting boss 48 which is formed with a socket 49 for receiving the actuating coil 43. The size of the boss 48 is preferably such that the socket 49 may extend about the coil 43 to the points 50, 51 which are substantially past a diametrical line extending through the axis of the coil 43, so that the socket 49 is adapted to engage the sides of the coil 43 over more than half its periphery, and the coil 43 is adapted to be slidably inserted in the socket 49. The boss 48 preferably extends inward past the points 50, 51 on each side of the coil to provide a support for a pair of coil securing plates 52, 53 which are preferably mounted in complementary slots 54, 55 respectively.

The coil securing plates 52, 53 comprise elongated strips of resilient sheet metal, each strip being provided with an aperture 56 for receiving the reduced threaded end 57 of a dial supporting post 58. The engagement between the edges of the plates 52, 53 with the walls of the complementary slots 54, 55 effectively prevents movement of the coil securing plates 52, 53 when they are secured in place by the threaded members 58 and the outer ends 59 of strips 52, 53 resiliently engage the end of the actuating coil 43 and secure it in its socket 49.

A woven fabric boot 60 such as a short length of braided tubular fabric is slidably mounted on both the ends 59 of strips 52, 53 for preventing the metal strips 52, 53 from damaging the wire of actuating coil 43 or short circuiting any of the coils by wearing off the insulation.

The boss 48 is preferably provided at each side with a female metallic threaded member 61 which is embedded in the insulating material of the base 28 during the molding operation and adapted to receive the threaded ends 57 of the dial supporting posts 58. In some embodiments of the invention the dial supporting posts 58 may be threaded directly into the insulating material but the imbedded threaded members 61 provide a more firm and durable support for the dial supporting posts 58. The dial supporting posts 58 comprise elongated metal members provided with reduced threaded portions 57 and formed with annular shoulders 62 for engaging and securing the strips 52, 53, the posts 58 being preferably provided with non-circular wrench engaging formations 63 and with threaded bores 64 for receiving the stop screws 65.

The dial 13 comprises a substantially circular plate of metal provided with an aperture 67 surrounding the bridge 68 and provided with a scale 69 having appropriate scale divisions and indicia formed on the surface of the metal plate by etching, printing or by pasting on a layer of paper on which the scale and its indicia have been printed. The dial 66 is provided with a pair of apertures 70 for receiving the reduced threaded ends 71 of the stop posts 65 and the dial 66 may be secured in place by the stop posts 65 which are provided with annular shoulders 72 and with an elongated body 73 adapted to be engaged by the needle 74 to limit excessive movement of the needle. The head 75 of each stop post is preferably provided with a kerf 76.

The magnetic vane type of instrument is preferably provided with an actuating coil 43 wound upon a core which is oblong in cross section substantially as shown in Fig. 3, so as to provide space for the oblong body 77 of an indicating unit indicated in its entirety at 78. The indicating unit 78 is preferably formed of the same type of molded insulating material having the elongated oblong body 77 and a laterally projecting supporting and attaching flange 79 at one end. The boss 48 on the base 28 is preferably provided with a substantially flat upper surface 80 in which are secured a plurality of female threaded metallic members 81, these members being embedded in the molding operation and adapted to engage the complementary threaded ends of screw bolts 82. Screw bolts 82 pass through apertures 83a in the supporting flange 79 and secure the indicating unit 78 to base 28.

The oblong body 77 is provided with an elongated damping chamber 83 having a substantially cylindrical wall 84 and a pair of substantially flat walls 85, 86, the flat walls diverging from a substantially cylindrical groove 87. The bottom 88 of the damping chamber 83 is preferably provided with a threaded aperture 89 adapted to receive a bearing screw 90 which is provided with a jewel 91 and secured in place by a set screw 92.

The open upper end 93 of the damping chamber may be closed by a cover plate 94 of a size slightly larger than the open end 93 and secured in place by screw bolts 95 threaded into bores in the insulating flanges 79. The cover plate 94 preferably has an enlarged aperture 96 surrounding the spindle 97. The spindle 97 comprises an elongated metal member preferably formed of light metal such as aluminum and provided at each end with a pivot point 98 comprising a hardened steel point fixedly set in the end of spindle 97. Spindle 97 is also provided with an elongated axially extending slot 99 for receiving the attaching flange 100 of a magnetic damping vane 101. The damping vane 101 comprises a substantially rectangular member of magnetic material such as iron which is substantially complementary in shape to the vertical section of the damping chamber 83, but is provided with a small clearance 102 with all of the walls of the chamber 83. The damping vane 101 may be provided with a laterally projecting border flange 103 at its top, bottom and lateral edges for reinforcing the vane and substantially increasing the damping effect on account of the cup action of a vane of this type.

The attaching flange 100 of the vane 101 is secured in the slot 99 by a plurality of transverse rivets 104 and the axis of the bearing screw 90 is preferably so located that the damping vane 101 sweeps across the damping chamber 83 with a relatively small leakage of air about the damping vane, but with a certain clearance between all parts of the moving element and the supporting body 77. The flat wall 85 of the damping chamber 83 is provided with a fixed magnetic plate 105, preferably of substantially rectangular shape and preferably embedded in the wall 85 and secured by means of a screw bolt 106 passing through the wall 85 and threaded into the fixed plate 105. The base 28 is preferably provided with a socket 107 for receiving the oblong end of the body 77 and with a socket 108 for receiving the bearing screw 90 and nut 92 and permitting a range of adjustment of the lower bearing.

The indicating unit is preferably provided with a pair of upwardly projecting bridge posts 109, 110 having their reduced threaded ends 111 secured in threaded bores 112 in the insulating body of the indicating unit 78 and the bridge posts 110 are preferably provided with reduced threaded upper ends 113 for supporting a bridge 114. The posts 109, 110 and bridge 114 are preferably constructed of non-magnetic metal such as brass, and the bridge 114 comprises an elongated strip of metal formed with a centrally located threaded aperture 115 for receiving a bearing screw 116, and provided with apertures 117 at each end for receiving the reduced threaded ends 113 of the bridge posts 109, 110.

A lock nut 118 secures the bearing screw 116 in any adjusted position and the bearing screw 116 is provided with the usual jewel 119 for pivotally supporting the spindle 97. Cap nuts 120 secure the bridge 114 against the shoulders 121' on the bridge posts and the bridge 114 preferably supports an adjustable spring abutment plate 121 having a spring supporting arm 122.

The spindle 97 is provided at its upper end with an annular shoulder 123 against which is secured the pointer 74 and the balance plate 124 which is provided with a plurality of radially projecting balance arms 125, 126, 127. The spring abutment plate 128 comprises a sheet metal member having an aperture for receiving the reduced upper end 129 of spindle 97 and having an upwardly projecting arm 130 which is fixedly secured to the inner end of a spiral spring 131 of phosphor-bronze or other resilient material. Spring abutment plate 128, balance plate 124 and pointer 74 are all secured against annular shoulder 123 by rivet formations made on the reduced end 129 of the spindle 97. The pointer 74 is usually formed with an off-set 132 and any form of balancing mechanism may be utilized.

In the more inexpensive type of instrument, however, the pointer 74 may be balanced by placing drops of solder on the balance arms 125, 126 and soldering a weight 133 to the arm 127 which projects oppositely to the pointer 74.

In order to permit adjustment of the length of the spring 131 to make the amount of the full load deflection correspond to the length of the scale and at the same time cause the pointer to register at zero or approximately at zero, the spring abutment plate 121 is preferably provided with a centrally located aperture 134 for rotatably mounting the abutment plate 121 on the bearing screw 116. The abutment plate 121 is also preferably formed with a plurality of radial notches 135 in its periphery thereby providing a plurality of teeth 136 between which a latching member 137 carried by zero corrector plate 26 may be engaged. In some embodiments of the invention the zero corrector plate may be eliminated and the adjustable spring abutment adapted to be latched directly to the bridge 114, but in the preferred embodiment the bearing screw 116 also rotatably supports a zero corrector plate 26 having a centrally located aperture 138 and a latching member 137. The latching member 137 comprises an axially projecting ear or flange on the zero corrector plate 26 and adapted to be engaged in the slots 135 formed in the adjustable spring abutment plate 121.

It should also be understood that the various forms of latching devices which may be employed are susceptible of many modifications as for instance the latch 137 may be carried by the adjustable abutment plate 121 and the notches 135 may be apertures formed in the zero corrector plate 26, or the spring abutment plate 121 may be provided with a milled edge for engaging a knife edge latching member carried by the zero correction plate.

The adjustable spring abutment is also preferably provided with resilient means for retaining the latching device in latched position such as for instance a spring plate 139, formed with a centrally located enlarged aperture 140 about the bearing screw 116 and provided with apertures 141 at each end for receiving the reduced threaded ends 113 of bridge posts 109.

The spring plate 139 is preferably formed with off-sets 142 adjacent each end and the central portion of the spring about the aperture 140 resiliently engages the spring abutment plate 121 and urges the latch 137 into latching engagement with the teeth 136. The latch 137 may be moved out of latching engagement by spreading the zero correction plate 26 and spring abutment plate 121 against the tension of spring plate 139 until the latch 137 passes over the teeth 136. The spring abutment arm 122 is preferably bent downward at 143 through the enlarged aperture 140 in spring plate 139. The spring abutment plate 121 is slit inward at 144 on both sides of spring abutment arm 122, so that the downward bend 143 may be made close to the bearing screw 116 inside the spring plate aperture 140, and the spring abutment arm is provided with a downwardly turned end 145 to which the spring is secured by any convenient fastening means such as a drop of solder. It will thus be observed that there is no interference between the spring abutment arm 122 and the spring plate 139, or the other parts of the associated mechanism, and the spring abutment plate 121 is adapted to be rotated throughout three hundred sixty degrees or more when the latch 137 is released.

As previously stated, the spring 131 is preferably attached at a point spaced from its end and tested at full load current for full load scale deflection, after which the spring may be shortened, lengthened, or the excess length immediately clipped off, if the deflection conforms to standard. The adjustable spring abutment plate may be rotated to any desired position after this adjustment of the spring, and consequently the needle 74 may be brought back to approximately zero position, and the range of movement of the indicating unit made to conform to that of the standard scale.

The adjustable spring abutment plate is adapted to be rotated by the zero correction plate 26 through the engagement of the latch 137 and teeth 136 and the final zero adjustment may be accomplished by the zero correction screw 21, the eccentric pin 24 of which engages between the diverging legs 25 of the zero correction plate 26.

The basic principle of operation of the present measuring instrument is fundamentally the same as that of most instruments of the moving vane type, and need not, therefore, be described in detail. It will thus be observed that I have invented an improved instrument assembly which may be very economically manufactured and which is also capable of giving accurate results for a long period of time without necessity for repair.

The present instrument includes an improved adjustable spring abutment which is provided with positive latching means capable of maintaining the desired adjustment of a spring abutment at all times, but which may be readily released and adjusted without the necessity for special tools.

While I have illustrated and described a specific embodiment of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is:

1. A zero adjuster for an electrical instrument, comprising a bridge, a bearing screw carried thereby for supporting one end of a rotatable element, a spring abutment plate rotatably mounted on said bearing screw and having a radially extending arm for supporting one end of the spring, a zero adjuster plate between said abutment plate and bridge, said abutment plate being formed with a plurality of radially extending notches and said zero adjuster plate being formed with an axially extending lug for engaging in said notches, and resilient means for urging said plates together, whereby said plates may be separated to remove said lug from one of said slots and to effect relative rotation between said zero adjustment plate and spring abutment plate.

2. A zero adjuster for an electrical instrument, comprising a bridge, a bearing screw carried thereby for supporting one end of a rotatable element, a spring abutment plate rotatably mounted on said bearing screw and having a radially extending arm for supporting one end of the spring, a zero adjuster plate between said abutment plate and bridge, said abutment plate being formed with a plurality of radially extending notches and said zero adjuster plate being formed with an axially extending lug for engaging said notches, a pair of bridge posts for supporting said bridge, and resilient means comprising a resilient plate carried by said bridge posts and adapted to urge said plates together, whereby said plates may be separated to remove said lug from one of said slots and to effect relative rotation between said zero adjustment plate and spring abutment plate.

In witness whereof, I hereunto subscribe my name this 31 day of July, 1930.

EDMUND L. MABIE.